United States Patent
Sridhara et al.

(10) Patent No.: US 10,397,053 B2
(45) Date of Patent: Aug. 27, 2019

(54) METHODS FOR MANAGING STORAGE VIRTUAL MACHINE CONFIGURATION CHANGES IN A DISTRIBUTED STORAGE SYSTEM AND DEVICES THEREOF

(71) Applicant: NetApp, Inc., Sunnyvale, CA (US)

(72) Inventors: Harsha Sridhara, Bangalore (IN); Balaji Ramani, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 345 days.

(21) Appl. No.: 14/459,907

(22) Filed: Aug. 14, 2014

(65) Prior Publication Data

US 2016/0050113 A1 Feb. 18, 2016

(51) Int. Cl.
| | |
|---|---|
| *H04L 12/24* | (2006.01) |
| *H04L 29/08* | (2006.01) |
| *G06F 9/455* | (2018.01) |
| *G06F 11/14* | (2006.01) |

(52) U.S. Cl.
CPC ...... *H04L 41/0816* (2013.01); *G06F 9/45558* (2013.01); *H04L 41/0853* (2013.01); *H04L 41/28* (2013.01); *H04L 67/1097* (2013.01); *G06F 11/1446* (2013.01); *G06F 2009/45579* (2013.01); *G06F 2201/815* (2013.01)

(58) Field of Classification Search
CPC ............... G06F 11/301; G06F 9/45533; G06F 9/45558; G06F 2009/45587; G06F 21/6218; G06F 2221/2147; H04L 63/10; H04L 41/0813; H04L 41/0816; H04L 41/28; H04L 41/0853; H04L 67/1097
See application file for complete search history.

(56) References Cited

U.S. PATENT DOCUMENTS

| | | | |
|---|---|---|---|
| 7,233,975 B1 * | 6/2007 | Gerraty ................... | H04L 45/02 707/999.008 |
| 2005/0086237 A1 * | 4/2005 | Monnie .................... | G06F 9/544 |
| 2008/0043756 A1 * | 2/2008 | Droux ...................... | H04L 12/66 370/399 |
| 2009/0222880 A1 * | 9/2009 | Mayer .................. | G06F 21/6218 726/1 |
| 2010/0011178 A1 * | 1/2010 | Feathergill .......... | G06F 11/1466 711/162 |
| 2011/0296069 A1 * | 12/2011 | Tarta ....................... | G06F 9/526 710/200 |
| 2012/0089666 A1 * | 4/2012 | Goswami ............. | G06Q 10/103 709/203 |

(Continued)

*Primary Examiner* — Tonia L Dollinger
*Assistant Examiner* — Kristoffer L S Sayoc
(74) *Attorney, Agent, or Firm* — Cooper Legal Group, LLC

(57) ABSTRACT

A method, non-transitory computer readable medium and storage controller computing device that receives a configuration change request for a storage virtual machine, the configuration change request including a configuration change operation. A determination is made when configuration settings for the storage virtual machine are locked. The configuration change operation is applied to the configuration settings for the storage virtual machine when the determining indicates the configuration settings for the storage virtual machine are not locked. A failure message is sent in response to the configuration change request when the configuration settings for the storage virtual machine are determined to be locked.

20 Claims, 5 Drawing Sheets

(56) References Cited

U.S. PATENT DOCUMENTS

2012/0290828 A1* 11/2012 Bhargava ............ G06F 11/3006
713/100
2014/0068127 A1* 3/2014 Baron .................... G06F 9/526
710/200

* cited by examiner

| Storage Virtual Machine Lock Table 34 | | |
|---|---|---|
| Storage Virtual Machine ID | Flag | Subset of Settings |
| | | |
| | | |
| | | |

FIG. 4

METHODS FOR MANAGING STORAGE VIRTUAL MACHINE CONFIGURATION CHANGES IN A DISTRIBUTED STORAGE SYSTEM AND DEVICES THEREOF

FIELD

This technology relates to data storage networks, and more particularly to methods and devices for managing storage virtual machine configuration changes in a distributed storage system.

BACKGROUND

Storage clusters generally include storage controller computing devices and storage servers with storage volumes, among other devices. The storage controller computing devices can host storage virtual machines which are visible to and accessible by many or all of the storage controller computing devices in a storage cluster. The storage virtual machines execute applications that manage the storage of data on, and retrieval of data from, the volumes hosted by the storage servers in the storage cluster. Each of the storage virtual machines can be managed by a storage virtual machine administrator and the cluster as a whole can be managed by a cluster administrator.

Each of the storage virtual machines operates according to a plurality of configuration settings established by a storage virtual machine administrator and/or an administrator of the storage cluster in which the storage virtual machine resides. The configuration settings can establish administrator and other users for a storage virtual machine, volume and/or network operations a storage virtual machine is capable of performing, and/or DNS and/or CIFS/NFS configurations for a storage virtual machine, for example.

Often configuration settings for a storage virtual machine are changed by configuration change operations submitted by an administrator (e.g., the storage virtual machine administrator) or a third party tool, without the knowledge or authorization of another administrator (e.g., the cluster administrator) or user, which can introduce unpredictability in the operation of the storage virtual machine. Additionally, snapshots of the configuration settings for a storage virtual machine are often captured, such as to create a backup for purposes of disaster recover for example. However, configuration change operations submitted during the capture of a snapshot of the configurations settings for a storage virtual machine can result in inaccuracies in the snapshot, which is undesirable.

SUMMARY

A method for managing storage virtual machine configuration changes in a distributed storage system includes receiving, by a storage controller computing device, a configuration change request for a storage virtual machine, the configuration change request including a configuration change operation. A determination is made by the storage controller computing device when configuration settings for the storage virtual machine are locked. The configuration change operation is applied by the storage controller computing device to the configuration settings for the storage virtual machine when the determining indicates the configuration settings for the storage virtual machine are not locked.

A host device comprising a processor coupled to a memory and configured to execute programmed instructions stored in the memory to perform steps including receiving a configuration change request for a storage virtual machine, the configuration change request including a configuration change operation. A determination is made when configuration settings for the storage virtual machine are locked. The configuration change operation is applied to the configuration settings for the storage virtual machine when the determining indicates the configuration settings for the storage virtual machine are not locked.

A non-transitory computer readable medium having stored thereon instructions for managing storage virtual machine configuration changes in a distributed storage system comprising machine executable code which when executed by a processor, causes the processor to perform steps including receiving a configuration change request for a storage virtual machine, the configuration change request including a configuration change operation. A determination is made when configuration settings for the storage virtual machine are locked. The configuration change operation is applied to the configuration settings for the storage virtual machine when the determining indicates the configuration settings for the storage virtual machine are not locked.

This technology provides a number of advantages including providing more efficient and effective methods, non-transitory computer readable medium, and devices for managing storage virtual machine configuration changes in a distributed storage system. With this technology, configuration settings of storage virtual machines can be locked by cluster administrators and, optionally, storage virtual machine administrators. When locked, changes to the configurations settings for a storage virtual machine configuration can not be made and, instead, fail gracefully with a response message indicating that the storage virtual machine is locked. Advantageously, storage virtual machines can be locked while a snapshot of the associated configuration settings is captured and any configuration change operations received during the capture can be applied upon completion of the snapshot.

BRIEF DESCRIPTION OF THE DRAWINGS

FIG. 4 is an exemplary storage virtual machine lock table; and

DETAILED DESCRIPTION

Figure 1:
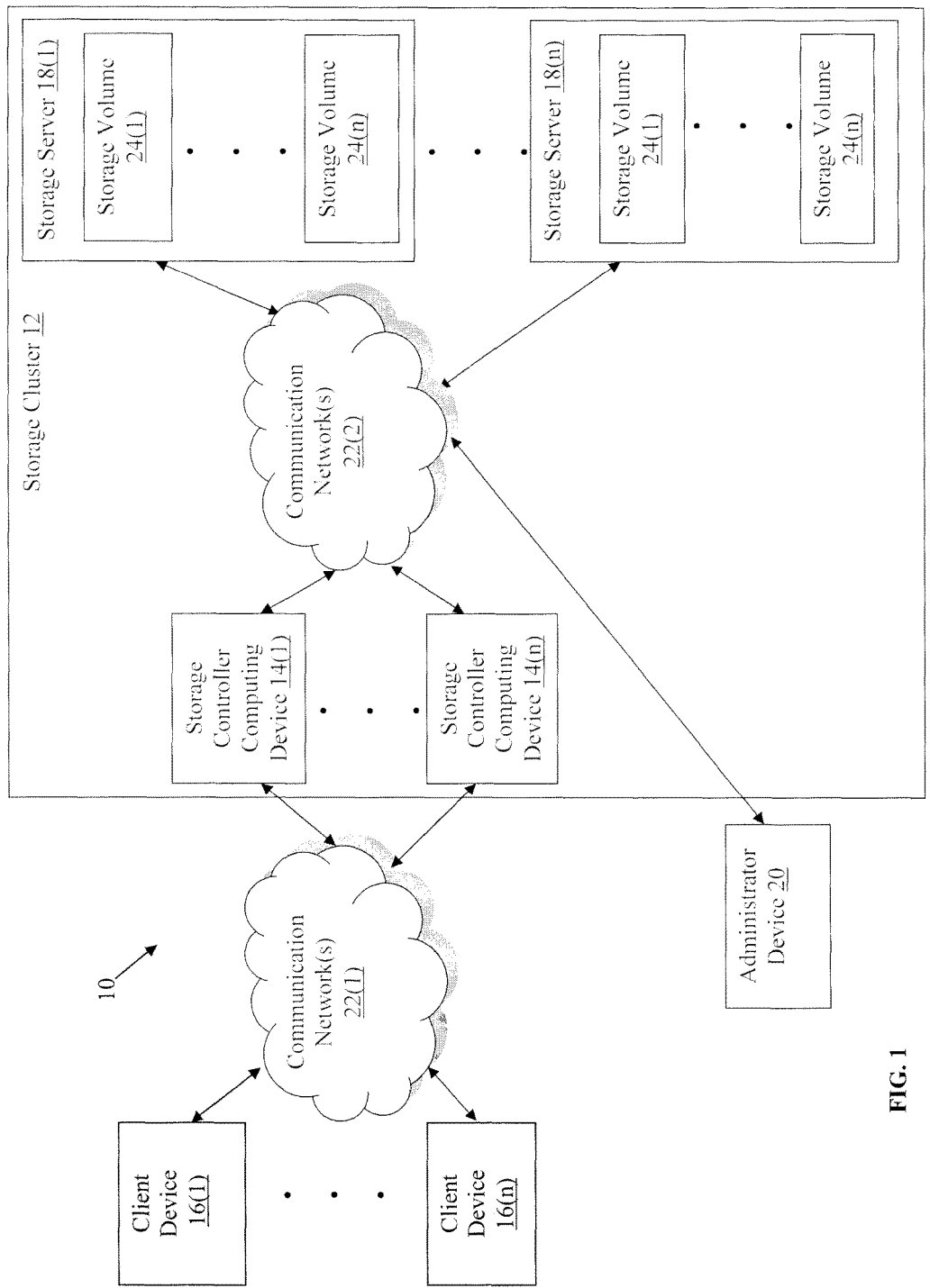
FIG. 1 a block diagram of a network environment with an exemplary storage cluster including a plurality of storage controller computing devices.

A network environment 10 including an example of a storage cluster 12 with exemplary storage controller computing devices 14(1)-14(n) is illustrated in FIG. 1. The environment 10 in this example further includes client devices 16(1)-16(n), storage servers 18(1)-18(n), and an administrator device 20, although this environment 10 can include other numbers and types of systems, devices, components, and/or elements in other configurations. The client computing devices 16(1)-16(n) communicate with the storage controller computing devices 14(1)-14(n) through the communication network(s) 22(1) and the storage controller computing devices 14(1)-14(n) communicate with the storage servers 18(1)-18(n) through communication network(s) 22(2) in this example. This technology provides a number of advantages including methods, non-transitory computer readable media, and devices that manage storage virtual machine configuration changes by facilitating the locking and unlocking of storage virtual machine configurations.

Each of the client devices 16(1)-16(n) in this example can include a processor, a memory, a communication interface, an input device, and a display device, which are coupled together by a bus or other link, although each of the client devices 16(1)-16(n) can have other types and numbers of components or other elements and other numbers and types of network devices could be used. The client devices 16(1)-16(n) may run interface applications that provide an interface to make requests for and send content and/or data to the storage controller computing devices 14(1)-14(n) via the communication network(s) 22(1), for example. Each of the client devices 16(1)-16(n) may be, for example, a conventional personal computer, a tablet computing device, a smart phone, a virtual machine running in a cloud, or other processing and/or computing device.

Each of the storage servers 18(1)-18(n) in this example includes storage volumes 24(1)-24(n), a processor, and a communication interface coupled together by a bus or other link. The storage volumes 24(1)-24(n) in this example can include conventional magnetic disks, solid-state drives (SSDs), or any other type of stable, non-volatile storage device suitable for storing large quantities of data. The storage servers 18(1)-18(n) may be organized into one or more volumes of Redundant Array of Inexpensive Disks (RAID), although other types and numbers of storage servers in other arrangements can be used.

The administrator device 20 in this example is used by an storage cluster or storage virtual machine administrator to change, lock, and/or unlock storage virtual machine configuration settings, as well as perform other functions with respect to the storage cluster 12, as described and illustrated in more detail later. The administrator device 20 can include a processor, a memory, a communication interface, an input device, and a display device, which are coupled together by a bus or other link, although the administrator device 20 can also have other types and numbers of components. The administrator device 20 can be a conventional personal computer or any other type of network-connected computing device.

While the administrator device 20 in this example is illustrated as communicating with the storage controller computing devices 14(1)-14(n) over the communication network(s) 22(2), in other examples, the administrator device 20 can communicate with the storage controller computing devices 14(1)-14(n) using communication network(s) 22(1). In yet other examples, storage cluster and/or storage virtual machine administrators can communicate with the storage controller computing devices 14(1)-14(n) directly, and without the use of a separate computing device such as the administrator device 20 illustrated in FIG. 1.

The storage controller computing devices 14(1)-14(n) in this example operate on behalf of the client devices 16(1)-16(n) to store, retrieved, and/or manage files or other units of data stored by the storage servers 18(1)-18(n). Accordingly, the storage controller computing devices 14(1)-14(n) manage and provision the storage volumes 24(1)-24(n) of the storage servers 18(1)-18(n) in this example and receive and respond to various read and write requests from the client devices 16(1)-16(n) directed to data stored in, or to be stored in, one or more of the storage volumes 24(1)-24(n) of the storage servers 18(1)-18(n).

Figure 2:
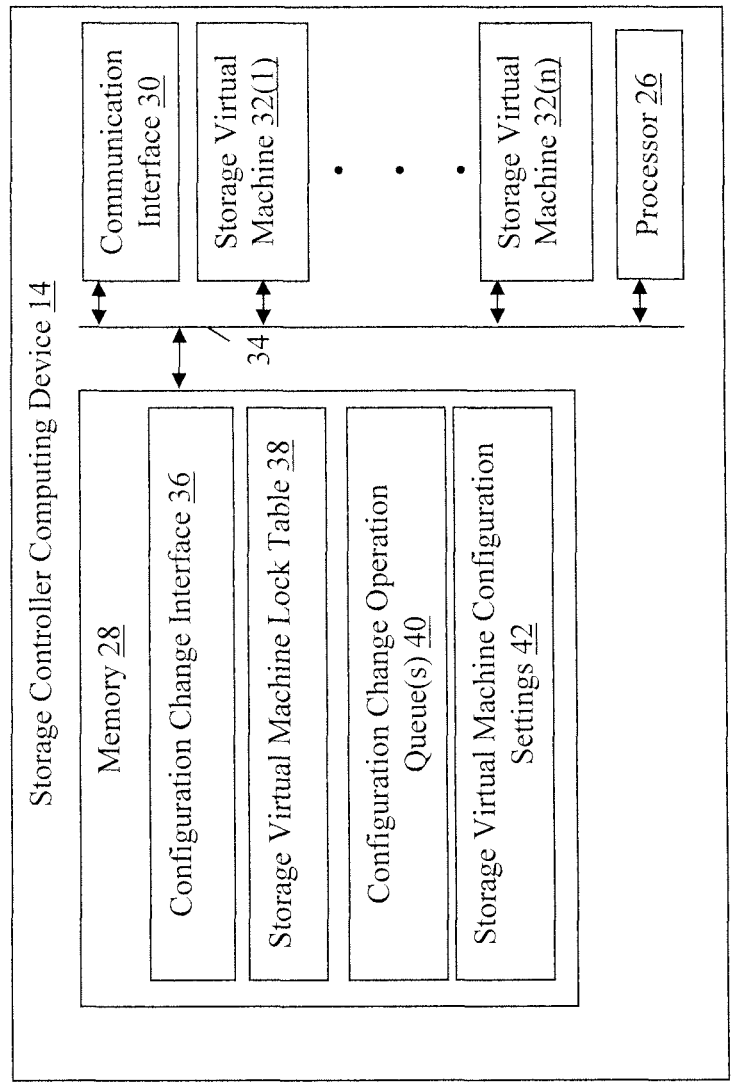
FIG. 2 is a block diagram of an exemplary storage controller computing device hosting a plurality of virtual machines.

Referring to FIG. 2, a block diagram of one of the exemplary storage controller computing devices 14(1)-14(n) is illustrated. In this example, the storage controller computing device 14 includes a processor 26, a memory 28, a communication interface 30, and a plurality of storage virtual machines 32(1)-32(n) coupled together by a bus 34 or other communication link. While the storage virtual machines 32(1)-32(n) are illustrated in this example as being hosted by the storage controller computing device 14, one or more of the storage virtual machines 32(1)-32(n) can be hosted by any of the storage controller computing devices 14(1)-14(n). However, in this example, each of the storage virtual machines 32(1)-32(n) is accessible by, and visible to, each of the storage controller computing devices 14(1)-14(n) in the storage cluster 12.

The processor 26 of the storage controller computing device 14 executes a program of stored instructions for one or more aspects of the present invention, as described and illustrated by way of the embodiments herein, although the processor 34 could execute other numbers and types of programmed instructions. The processor 26 in the storage controller computing device 14 may include one or more central processing units or general purpose processors with one or more processing cores, for example.

The memory 28 of the storage controller computing device 14 may include any of various forms of read only memory (ROM), random access memory (RAM), Flash memory, non-volatile, or volatile memory, or the like, or a combination of such devices for example. The memory 28 can store instructions that, when executed by the processor 26, instantiates the storage virtual machines 32(1)-32(n) for example, although the act storage virtual machines 32(1)-32(n) can be executed and implemented in other manners.

In this example, the memory 28 further includes a configuration change interface 26, a storage virtual machine lock table 38, configuration change operation queue(s) 40, and storage virtual machine configuration settings 42, although the memory 28 of the storage controller computing device 14 can store other information in other data structures and one or more of the configuration change interface 26, storage virtual machine lock table 38, configuration change operation queue(s) 40, and/or storage virtual machine configuration settings 42 could be stored elsewhere. Additionally, at least the storage virtual machine lock table 38, configuration change operation queue(s) 40, and storage virtual machine configuration settings 42 are accessible by, and visible to, each of the storage controller computing devices 14(1)-14(n), such as by replication and/or storage on a separate device in communication with the storage controller computing devices 14(1)-14(n) over communication network(s) 22(2).

The configuration change interface 36 is provided to a storage cluster or storage virtual machine administrator to facilitate access to the storage virtual machine configuration settings 42. Accordingly, the configuration change interface 36 can facilitate viewing of configuration settings for one of the storage virtual machines 32(1)-32(n), submitting of configuration change requests for one of the storage virtual machines 32(1)-32(n), and/or locking/unlocking at least a portion of the configuration settings for one of the storage virtual machines 32(1)-32(n). The configuration change interface 36 can be a relatively complex web-based portal accessible by the administrator device 20 over communication networks 22(1) or 22(2), or a relatively simple command line interface, for example, although other times of configuration change interfaces 36 can also be used.

The storage virtual machine lock table 38 includes flags associated with unique identifiers for each of the storage virtual machines 32(1)-32(n). The flags can be set or reset by administrators to indicate that at least a portion of the configuration settings for one of the storage virtual machines 32(1)-32(n) has been locked, such as by an administrator and/or during a snapshot capture, for example, as described and illustrated in more detail later with reference to FIGS. 3-5.

The configuration change operation queue(s) 40 include a queue for each of the storage virtual machine 32(1)-32(n) that are used to store configuration change operations received while for any of the storage virtual machines 32(1)-32(n) that is locked during a snapshot capture. The configuration change operation queue(s) 40 can be one or more tables, a database, or any other structure capable of storing configuration change requests and providing the configuration change requests upon completion of a snapshot capture for one of the storage virtual machines 32(1)-32(n).

The storage virtual machine configuration settings include various settings for the storage virtual machines 32(1)-32(n) that can be established, modified, locked, and/or unlocked, for example. Exemplary configuration settings include administrator and other users for each of the storage virtual machines 32(1)-32(n), volume and/or network operations each of the storage virtual machines 32(1)-32(n) is capable of performing, and/or DNS and/or CIFS/NFS configurations for each of the storage virtual machines 32(1)-32(n), although other types and numbers of configuration settings can also be used.

The communication interface 30 of the storage controller computing device 14 in this example can include one or more network interface controllers (NICs) for operatively coupling and communicating between the storage controller computing device 14, the client devices 16(1)-16(n), the storage servers 18(1)-18(n), and the administrator device 20, which are coupled together by the communication network(s) 22(1) and 22(2), although other types and numbers of communication networks or systems with other types and numbers of connections and configurations to other devices and elements also can be used.

By way of example only, the communication network(s) 22(1) and/or 22(2) can use TCP/IP over Ethernet and industry-standard protocols, including NFS, CIFS, SOAP, XML, LDAP, and SNMP, although other types and numbers of communication networks, can be used. The communication network(s) 22(1) and 22(2) in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 22(1) and 22(2) may also comprise any local area network and/or wide area network (e.g., Internet), although any other type of traffic network topologies may be used.

Although examples of the storage controller computing device 14, client devices 16(1)-16(n), storage servers 18(1)-18(n), and administrator device 20 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
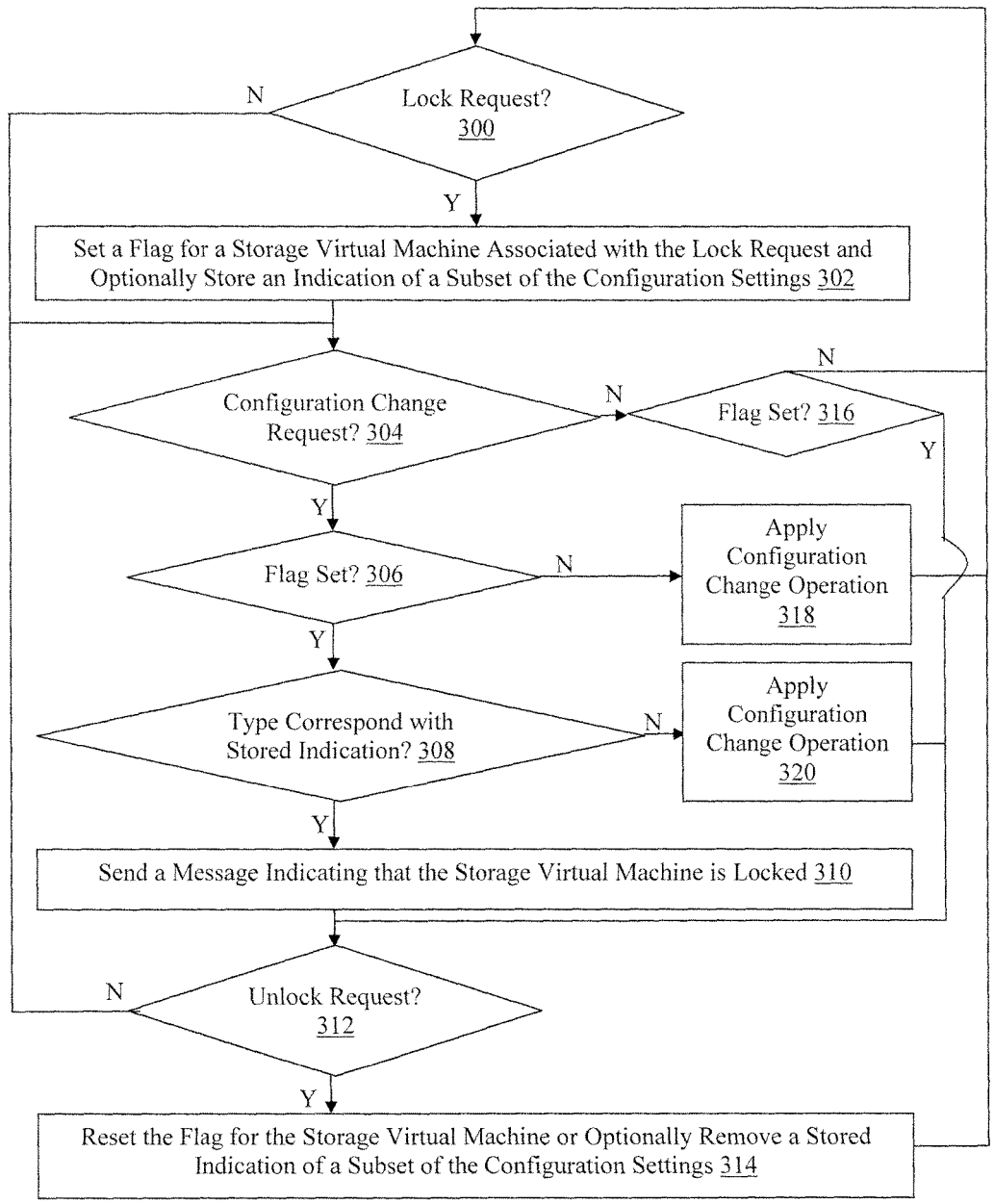
FIG. 3 is a flowchart of an exemplary method for locking a storage virtual machine configuration.

An exemplary method for managing storage virtual machine configuration changes in a distributed storage system will now be described with reference to FIGS. 1-5. Referring more specifically to FIG. 3, an exemplary method for locking the configuration settings for one of the storage virtual machines 32(1)-32(n) is illustrated. In step 300 in this example, the storage controller computing device 14 determines when a lock request for one of the storage virtual machines 32(1)-32(n) has been received. The lock request can be a request to lock at least a portion of the configuration settings for one of the storage virtual machines 32(1)-32(n). In one example, a lock request can be received through the configuration change interface 36 provided to an administrator, such as a user of the administrator device 20, for example.

The user of the administrator device 20 can be a storage cluster administrator, having administrator privileges for the storage cluster 12, or a storage virtual machine administrator, having administrator privileges for only one or more of the storage virtual machines 32(1)-32(n), for example. The storage cluster computing device 14 can be configured to allow certain types of administrators to submit a lock request, based on the provided configuration change interface 36, or allow any type of administrator to submit a lock request.

A lock request for one of the virtual storage machines 32(1)-32(n) can be submitted by an administrator of the storage cluster 12 in an effort to block a third party application or an administrator of one or more of the storage virtual machines 32(1)-32(n), for example, from modifying the configuration settings for the one of the virtual storage machines 32(1)-32(n). In another example, the lock request can be in the form of a snapshot request, as described and illustrated in more detail later with reference to FIG. 5. Other types of lock requests originating from other sources can also be used.

If the storage controller computing device 14 determines in step 300 that a lock request has been received, then the Yes branch is taken to step 302. In step 302, the storage controller computing device 14 locks the one of the storage virtual machines 32(1)-32(n) identified in the lock request, such as by setting a flag for one of the virtual storage machines 32(1)-32(n), for example, although other methods of locking the one of the storage virtual machines 32(1)-32 (n) can also be used. Optionally, the storage controller computing device 14 also stores an indication of a subset of the configuration settings identified in the lock request. In this example, the lock request can identify only a portion or subset of the configuration settings to lock, as indicated by the administrator through the provided configuration change interface 36.

For example, an administrator of the storage cluster 14 may want to lock the CIFS/NFS operations subset of the configuration settings for the one of the storage virtual machines 32(1)-32(n). In another example, an administrator of the one of the storage virtual machines 32(1)-32(n) may only want to lock the volume operations subset of the configuration settings for the one of the storage virtual machines 32(1)-32(n). Other types and numbers of subsets of configuration settings can also be locked for the one of the storage virtual machines 32(1)-32(n).

Referring more specifically to FIG. 4, an exemplary storage virtual machine lock table 38 is illustrated. In this example, the flag set by the storage virtual controller 14 in step 302 can be indicated in an entry of the storage virtual machine lock table associated with the one of the storage virtual machines 32(1)-32(n). In some examples, the flag is an indication of a unique identifier for the one of the storage virtual machines 32(1)-32(n) in the storage virtual machine lock table 34. In these examples, if the one of the storage virtual machines 32(1)-32(n) is not indicated in the storage virtual machine lock table 34, then the flag is not set and a lock request has not been received for the one of the storage virtual machines 32(1)-32(n). Other types and number of data structures and manners for storing an indication that at least a portion of the configuration settings for the one of the storage virtual machines 32(1)-32(n) has been locked can also be used.

Additionally, the subset of the configuration settings identified in the lock request, if any, can also optionally be indicated in the entry of the storage virtual machine lock table 34, for example, although the flag and/or the subset of the configuration settings can also be stored elsewhere. Optionally, the entry of the storage virtual machine lock table 34 inserted or modified in step 302 can be replicated across other storage virtual machine lock tables stored by other of the storage controller computing devices 14(1)-14(n) in the storage cluster 14.

Alternatively, the storage virtual machine lock table 34 can be stored by another device in the storage cluster 12 that is accessible to each of the storage controller computing devices 14(1)-14(n). Also optionally, the storage virtual machine lock table 34 can be replicated to a device outside of the storage cluster 12 periodically or whenever an entry is inserted or modified, for example. Accordingly, in some examples, the flag, and optionally the subset of settings, set in step 302 maintain their value across a reboot of the storage controller computing device 14 and/or the entire storage cluster 12.

Referring back to FIG. 3, subsequent to setting the flag in step 302, or if the storage controller computing device 14 determines a lock request is not received in step 300 then the No branch is taken and the storage controller computing device 14 proceeds to step 304. In step 304, the storage controller computing device 14 determines when a configuration change request for the one of the storage virtual machines 32(1)-32(n) is received. A configuration change request can be received through a third party application or a command line or other configuration change interface 36, for example, although the configuration change request can also be received in other manners. If the storage controller computing device 14 determines that a configuration change request has been received, then the Yes branch is taken to step 306.

In step 306, the storage controller computing device 14 determines when at least a portion of the configuration settings for the one of the storage virtual machines 32(1)-32(n) is locked, such as by determining when the flag for the one of the storage virtual machines 32(1)-32(n) is set, for example, although other methods of determining when at least a portion of the configuration settings for the one of the storage virtual machines 32(1)-32(n) is locked can also be used. Accordingly, the storage controller computing device 14 can look up an entry of the storage virtual machine lock table 34 corresponding to the one of the storage virtual machines 32(1)-32(n) to determine when the associated flag has been set, such as described and illustrated earlier with reference to step 302, for example. If the storage controller computing device 14 determines that the flag for the one of the storage virtual machines 32(1)-32(n) is set, then the Yes branch is optionally taken to step 308.

In optional step 308, the storage controller computing device 14 determines when a type of a configuration change request included in the configuration change operation corresponds with an indication of a subset of the configuration settings stored in step 302. For example, if the configuration change operation is an operation to reassign one of the storage volumes 24(1)-24(n) and an administrator of the one of the storage virtual machines 32(1)-32(n) has locked the volume operations subset of the configuration settings for the one of the storage virtual machines 32(1)-32(n), as indicated in the entry of the storage virtual machine lock table 34 for the one of the storage virtual machines 32(1)-32(n), then the type of the configuration change operation would match the stored indication.

Accordingly, if the storage controller computing device 14 determines in step 308 that the type of the received configuration change request corresponds with the indication of a subset of the configuration settings in the entry of the storage virtual machine lock table 34 for the one of the storage virtual machines 32(1)-32(n), then the configuration change should not be permitted and the Yes branch is taken to step 310. In step 310, the storage controller computing device 14 sends a message indicating that the storage virtual machine is locked, for example, or otherwise that the configuration change operation failed. The message can be sent to the administrator device 20 or output to a display, for example, although other types of message can be sent and the messages can be output in other manners.

In step 312, the storage controller computing device 14 determines when an unlock request for the one of the storage virtual machines 32(1)-32(n) has been received. As described and illustrated earlier in step 300 with reference to the lock request, an unlock request can also be received from an administrator, for example, through a provided configuration change interface 36, although other methods for receiving an unlock request can also be used. If the storage controller computing device 14 determines an unlock request for the one of the storage virtual machines 32(1)-32(n) has been received, then the Yes branch is taken to step 314.

In step 314, the storage controller computing device 14 resets the flag for the one of the storage virtual machines 32(1)-32(n). In order to reset the flag, the storage controller computing device 14 can change the value of the flag in an entry of the storage virtual machine lock table 34 for the one of the storage virtual machines 32(1)-32(n). In examples in which a subset of the configuration settings for the one of the storage virtual machines 32(1)-32(n) can be locked, the storage controller computing device 14 can remove an indication of a subset of the configuration settings indicated in the unlock request from the entry of the storage virtual machine unlock table 34 for the one of the storage virtual machines 32(1)-32(n).

Subsequent to resetting the flag or removing a storage indication, the storage controller computing device 14 can proceed back to step 300. Accordingly, in this example, the configuration settings for the one of the storage virtual machines 32(1)-32(n) can advantageously be locked and a configuration change request received while the configuration setting are locked can fail gracefully.

Referring back to step 304, if the storage controller computing device 14 determines that a configuration change request has not been received, then the No branch is taken to step 316. In step 316, the storage controller computing device 14 determines when the flag for the one of the storage virtual machines 32(1)-32(n) is set, as described and illustrated earlier with reference to step 306. If the storage controller computing device 14 determines in step 316 that the flag for the one of the storage virtual machines 32(1)-32(n) is not set, then a lock request was not received in step 300, and, accordingly, the No branch is taken back to step 300.

However, if the storage controller computing device 14 determines in step 316 that the flag for the one of the storage virtual machines 32(1)-32(n) is set, then a lock request was received in step 300 and the Yes branch is taken to step 312. In step 312, the storage controller computing device 14 determines when an unlock request is received for the one of the storage virtual machines 32(1)-32(n), as described and illustrated earlier.

Referring back to step 306, if the storage controller computing device 14 determines that the flag for the one of the storage virtual machines 32(1)-32(n) is not set, then a lock request was not received in step 300 and the No branch is taken to step 318. In step 318, the storage controller computing device 14 applies the configuration change operation received in step 304 to the configuration settings for the one of the storage virtual machines 32(1)-32(n). In order to apply the configuration change operation, the storage controller computing device 14 can modify the configurations settings for the one of the storage virtual machines 14 in the storage virtual machine configuration settings 42 stored in the memory 28, for example, although the configuration change operation can also be applied in other manners. Subsequent to applying the configuration change operation, the storage controller computing device 14 proceeds back to step 300 and determines when a lock request is received, as described and illustrated in more detail earlier.

Referring back to step 308, if the storage controller computing device 14 determines that the type of the configuration change operation does not correspond with a stored indication of a subset of the configuration settings for the one of the storage virtual machines 32(1)-32(n), then the No branch is taken to step 320. In step 320, the storage controller computing device 14 applies the configuration change operation, as described and illustrated earlier with reference to step 318. Accordingly, while other subset(s) of the configuration settings for the one of the storage virtual machines 32(1)-32(n) may be locked, in this example, the subset of the configuration settings corresponding to the type of the configuration change operation has not been locked. Therefore, the configuration change operation can be applied to the configuration settings for the one of the storage virtual machines 32(1)-32(n). Subsequent to applying the configuration change operation, the storage controller computing device 14 proceeds back to step 300 and determines when a lock request is received, as described and illustrated in more detail earlier.

Referring back to step 312, if the storage controller computing device 14 determines an unlock request has not been received, then the No branch is taken back to step 304. In step 304, the storage controller computing device 14 determines when a configuration change request has been received, as described and illustrated in more detail earlier.

Figure 5:
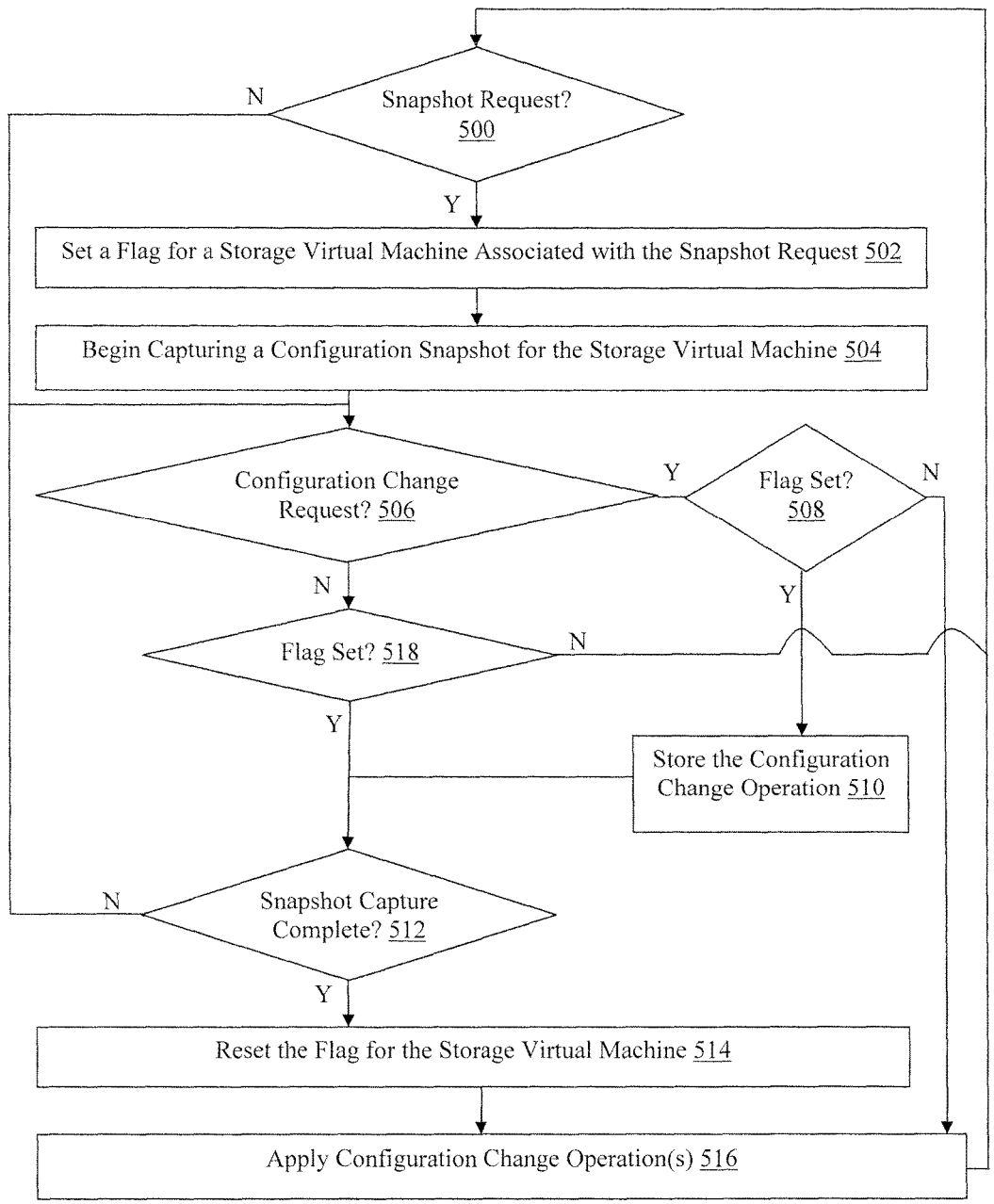
FIG. 5 is a flowchart of an exemplary method for locking a storage virtual machine configuration during a snapshot capture of the configuration settings for the storage virtual machine.

Referring more specifically to FIG. 5, an exemplary method for locking the configuration settings for one of the storage virtual machines 32(1)-32(n) during a snapshot capture of the configuration settings for the one of the storage virtual machines 32(1)-32(n) is illustrated. In step 500 in this example, the storage controller computing device 14 determines when a snapshot request has been received. Accordingly, in this example, the lock request is in the form of a snapshot request, which can be submitted explicitly by an administrator through the configuration change interface 36 or can be generated automatically by the storage controller computing device 14, for example, although the snapshot request can be received in other ways.

In many network environments, it is desirable to replicate the configuration settings for the storage virtual machines 32(1)-32(n) so that another storage virtual machine can take over in the event of a failure of one of the virtual machines 32(1)-32(n), such as due to a failure of one of the storage controller computing devices 14(1)-14(n) or the storage cluster 12, for example. Accordingly, if the storage controller computing device 14 determines in step 500 that a snapshot request has been received, then the Yes branch is take to step 502.

In step 502, the storage controller computing device 14 sets a flag for the one of the storage virtual machines 32(1)-32(n) associated with the snapshot request. The flag can be set in the storage virtual machine lock table 34, for example, as described and illustrated in more detail earlier with reference to step 302 of FIG. 3. In this example, all of the configuration settings for the one of the storage virtual machines 32(1)-32(n) should be locked during the snapshot capture.

In step 504, the storage controller computing device 14 begins capturing the configuration snapshot for the one of the storage virtual machines 32(1)-32(n). Subsequent to beginning to capture the snapshot, or if the storage controller computing device 14 determines in step 500 that a snapshot capture request has not been received and the No branch is taken, the storage controller computing device 14 proceeds to step 506.

In step 506, the storage controller computing device 14 determines when a configuration change request has been received, as described and illustrated in more detail earlier with reference to step 304 of FIG. 3. If the storage controller computing device 14 determines a configuration change request has been received, then the Yes branch is taken to step 508. In step 508, the storage controller computing device 14 determines when the flag associated with the one of the storage virtual machines 32(1)-32(n) is set, as described and illustrated in more detail earlier with reference to steps 306 and 316 of FIG. 3. If the storage controller computing device 14 determines in step 508 that the flag associated with the one of the storage virtual machines 32(1)-32(n) is set, then the Yes branch is taken to step 510.

In step 510, the storage controller computing device 14 stores a configuration change operation included in the configuration change request received in step 506. The configuration change operation can be stored in one of the configuration change operation queue(s) 40 as associated with the one of the storage virtual machines 32(1)-32(n), for example, although the configuration change operation can be stored elsewhere and other types of data structures can also be used. Accordingly, in this example, the configuration change operations received while the configuration snapshot is being captured are queue instead of being applied immediately upon receipt or failing.

In step 512, the storage controller computing device 14 determines when the snapshot capture begun in step 504 has completed. If the storage controller computing device 14 determines the snapshot capture has not completed, then the No branch is taken back to step 500. However, if the storage controller computing device 14 determines the snapshot capture has completed, then the Yes branch is taken to step 514.

Optionally, in step 512 the storage controller computing device 12 can also determine when a specified period of time has elapsed since the snapshot capture was begun in step 504. If the specified period of time has elapsed since the snapshot capture was begun in step 504, then the snapshot capture may have failed and any configuration change operations received subsequent to the beginning of the snapshot capture can fail gracefully with a response message indicating the failure.

Referring back to step 514, if the snapshot capture has completed as determined in step 512, then the storage controller computing device 14 resets the flag for the one of the storage virtual machines 32(1)-32(n), as described and illustrated in more detail earlier with reference to step 314 of FIG. 3. In step 516, the storage controller computing device 14 applies any configuration change operation(s) received during the snapshot capture and stored as described and illustrated earlier with reference to step 510.

Accordingly, the storage controller computing device 14 can retrieve the configuration change operation(s) from the configuration change operation queue(s) 40 using a unique identifier for the one of the storage virtual machines 32(1)-32(n), for example, and apply the retrieved configuration change operation(s) to the configuration settings for the one of the storage virtual machines 32(1)-32(n). Subsequent to applying the configuration change operation(s), the storage controller computing device 14 proceeds back to step 500.

Referring back to step 506, if the storage controller computing device 14 determines a configuration change request has not been received, then the No branch is taken to step 518. In step 518, the storage controller computing device 14 determines when the flag associated with the one of the storage virtual machines 32(1)-32(n) is set, as described and illustrated in more detail earlier with reference to step 508 and steps 306 and 316 of FIG. 3. If the storage controller computing device 14 determines in step 518 that the flag associated with the one of the storage virtual machines 32(1)-32(n) is not set, then the No branch is taken back to step 500. However, if the storage controller computing device 14 determines in step 518 that the flag associated with the one of the storage virtual machines 32(1)-32(n) is set, then the Yes branch is taken to step 512 and the storage controller determines when the snapshot capture is completed, as described and illustrated in more detail earlier.

Referring back to step 508, if the storage controller computing device 14 determines that the flag associated with the one of the storage virtual machines 32(1)-32(n) is not set, then the No branch is taken to step 516. In this example, a configuration change request has been received but the one of the virtual storage controllers 32(1)-32(n) has not been locked in response to a snapshot request. Accordingly, the storage controller computing device 14 can proceed directly to step 516 and applying the configuration change operation included in the configuration change request.

With this technology, configuration settings for storage virtual machines can advantageously be locked explicitly by an administrator and/or during a configuration snapshot. Accordingly, the functioning of a storage controller computing device is improved because administrators have controller over the modification of configuration settings for virtual storage machines and the operation of the virtual storage machines is therefore more predictable. Additionally, the functioning of a storage controller computing device is improved because configuration snapshots are consistent and disaster recovery results in more predictable operation of virtual storage machines that come online in place of failed virtual storage machines.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   setting a flag associated with a configuration setting of a storage virtual machine (SVM) to a locked value based upon a request to lock the configuration setting, wherein the flag is replicated from a device hosting the SVM to a remote device to store within persistent storage, wherein a snapshot operation to create a snapshot of the configuration setting generates the request to lock the configuration setting;
   queuing a configuration change requested to modify the configuration setting into a queue based upon the flag having the locked value;
   setting the flag to an unlocked value so that the first configuration setting can be modified based upon an unlock request to unlock the configuration setting;
   dequeuing and implementing the configuration change upon the first configuration setting based upon the first flag being set to the unlocked value and the snapshot operation successfully completing; and
   failing the configuration change based upon the snapshot operation failing to complete within a period of time.

2. The method of claim 1, wherein the flag is comprised within a lock table, of flags associated with configuration settings, stored by a first cluster comprising the device, and the method comprising:
   replicating the lock table as a replicated lock table stored by a second cluster, wherein the values of flags within the replicated lock table are maintained across reboot of the first cluster.

3. The method of claim 1, wherein the flag is comprised within a data structure, of flags associated with configuration settings, stored by a first cluster comprising the device, and the method comprising
   providing devices within the first cluster with access to the data structure within the persistent storage.

4. The method of claim 1, wherein the flag is comprised within a data structure, of flags associated with configuration settings, stored by a first cluster comprising the device, and the method comprising:
   triggering replication of the data structure based upon a modification to the flag within the data structure.

5. The method of claim 1, wherein the flag is comprised within a data structure, of flags associated with configuration settings, stored by a first cluster comprising the device, wherein the configuration settings comprise a second configuration setting associated a second flag set to an unlocked value within the data structure.

6. The method of claim 5, comprising:
implementing a second configuration change upon the second configuration setting based upon the second flag having the unlocked value.

7. The method of claim 1, wherein the setting the first flag comprises:
maintaining operation of the storage virtual machine while the first flag is set to the locked value.

8. The method of claim 1, comprising:
displaying a configuration change interface with configuration settings of the storage virtual machine for which a user accessing the configuration change interface has privileged access to lock and unlock.

9. The method of claim 1, wherein the configuration setting corresponds to an administrator assignment for the storage virtual machine.

10. The method of claim 1, wherein the configuration setting corresponds to a volume operation capable of being performed by the storage virtual machine.

11. The method of claim 1, wherein the configuration setting corresponds to a network operation capable of being performed by the storage virtual machine.

12. The method of claim 1, wherein the flag is comprised within a data structure, of flags associated with configuration settings, stored by a first cluster comprising the device, and the method comprising:
triggering replication of the data structure based upon a periodic schedule.

13. The method of claim 8, comprising:
receiving the request through the configuration change interface.

14. The method of claim 1, wherein the request corresponds to the snapshot operation that is to create the snapshot of the storage virtual machine, and the method comprising:
failing the request based upon a time period for the snapshot operation lapsing.

15. A computing device, comprising:
a processor coupled to a memory and configured to execute programmed instructions stored in the memory to perform steps comprising:
setting a flag associated with a configuration setting of a storage virtual machine (SVM) to a locked value based upon a request to lock the configuration setting, wherein the flag is replicated from a device hosting the SVM to a remote device to store within persistent storage, wherein a snapshot operation to create a snapshot of the configuration setting generates the request to lock the configuration setting;
queuing a configuration change requested to modify the configuration setting into a queue based upon the flag having the locked value;
setting the flag to an unlocked value so that the configuration setting can be modified based upon an unlock request to unlock the configuration setting;
dequeuing and implementing the configuration change upon the configuration setting based upon the flag being set to the unlocked value and the snapshot operation successfully completing; and
failing the configuration change based upon the snapshot operation failing to complete within a period of time.

16. The computing device of claim 15, wherein the steps comprise:
maintaining operation of the storage virtual machine while the first flag is set to the locked value.

17. The computing device of claim 15, wherein the steps comprise:
sending a message, indicating that the configuration change was failed, to an administrator device of an administrator that submitted the configuration change.

18. A non-transitory computer readable medium having stored thereon instructions comprising machine executable code which when executed by a processor, causes the processor to perform steps comprising:
setting a flag associated with a configuration setting of a storage virtual machine (SVM) to a locked value based upon a request to lock the configuration setting, wherein the flag is replicated from a device hosting the SVM to a remote device to store within persistent storage, wherein a snapshot operation to create a snapshot of the configuration setting generates the request to lock the configuration setting;
queuing a configuration change requested to modify the configuration setting into a queue based upon the flag having the locked value;
setting the flag to an unlocked value so that the configuration setting can be modified based upon an unlock request to unlock the configuration setting;
dequeuing and implementing the configuration change upon the configuration setting based upon the flag being set to the unlocked value and the snapshot operation successfully completing; and
failing the configuration change based upon the snapshot operation failing to complete within a period of time.

19. The non-transitory computer readable medium of claim 18, wherein the configuration setting corresponds to a volume operation capable of being performed by the storage virtual machine.

20. The non-transitory computer readable medium of claim 18, wherein the flag is comprised within a data structure, of flags associated with configuration settings, stored by a first cluster comprising the device, and the steps comprise:
replicating the data structure as a replicated data structure stored by a second cluster, wherein values of flags within the replicated data structure are maintained across reboot of the first cluster.

* * * * *